United States Patent
Sallee

[11] Patent Number: 6,161,497
[45] Date of Patent: Dec. 19, 2000

[54] VEHICLE POSITION INDICATOR

[76] Inventor: Billy P. Sallee, P.O. Box 923, White Oak, Tex. 75693

[21] Appl. No.: 09/273,589

[22] Filed: Mar. 22, 1999

[51] Int. Cl.[7] .................................................. B60Q 1/48
[52] U.S. Cl. ........................ 116/28 R; 116/56; 116/210
[58] Field of Search ........................ 116/28 R, 56, 116/58 R, 59, 203, 205, 209, 210, DIG. 7, DIG. 8; 446/180, 186, 190, 193, 197, 198, 314, 473; D21/589; 33/264; 40/412, 439, 477

[56] References Cited

U.S. PATENT DOCUMENTS

| | | | |
|---|---|---|---|
| D. 171,234 | 12/1953 | Sugita | D21/589 |
| 2,119,133 | 5/1938 | Hogan | 446/197 |
| 2,784,692 | 3/1957 | Ballesteros | 116/28 R |
| 2,854,942 | 10/1958 | Ross . | |
| 3,219,972 | 11/1965 | Williams | 116/28 R |
| 3,224,771 | 12/1965 | Altieri | 446/190 |
| 3,261,321 | 7/1966 | Mandl | 116/28 R |
| 3,977,354 | 8/1976 | Muzurek . | |
| 4,101,868 | 7/1978 | Bubnich et al. . | |
| 4,149,338 | 4/1979 | Wolf | 446/197 |
| 4,216,610 | 8/1980 | Ferris | 446/197 |
| 4,240,224 | 12/1980 | Katzman et al. | 446/197 |
| 4,965,571 | 10/1990 | Jones . | |
| 5,189,802 | 3/1993 | Bergfield | 116/28 R |
| 5,230,296 | 7/1993 | Giltz et al. . | |
| 5,231,392 | 7/1993 | Gust . | |
| 5,261,850 | 11/1993 | Barthold | 446/180 |

*Primary Examiner*—Andrew H. Hirshfeld
*Attorney, Agent, or Firm*—Joseph N. Breaux

[57] ABSTRACT

A parking aid in the form of a vehicle position indicator and parking method that includes an alerting mechanism that deploys when a portion of the vehicle contacts a deployment mechanism positioned in a predetermined location to alert the driver that the desired position has been achieved. The vehicle position indicator includes a weighted base assembly, a deployment bellows assembly in connection with the weighted base assembly, and an inflatable recoil tube in air flow communication with the deployment bellows assembly and supported on the weighted base. The deployment bellows assembly has an air volume equal to the air volume of the inflatable recoil tube such that when the deployment bellows is fully compressed, the inflatable recoil tube is fully inflated.

1 Claim, 2 Drawing Sheets

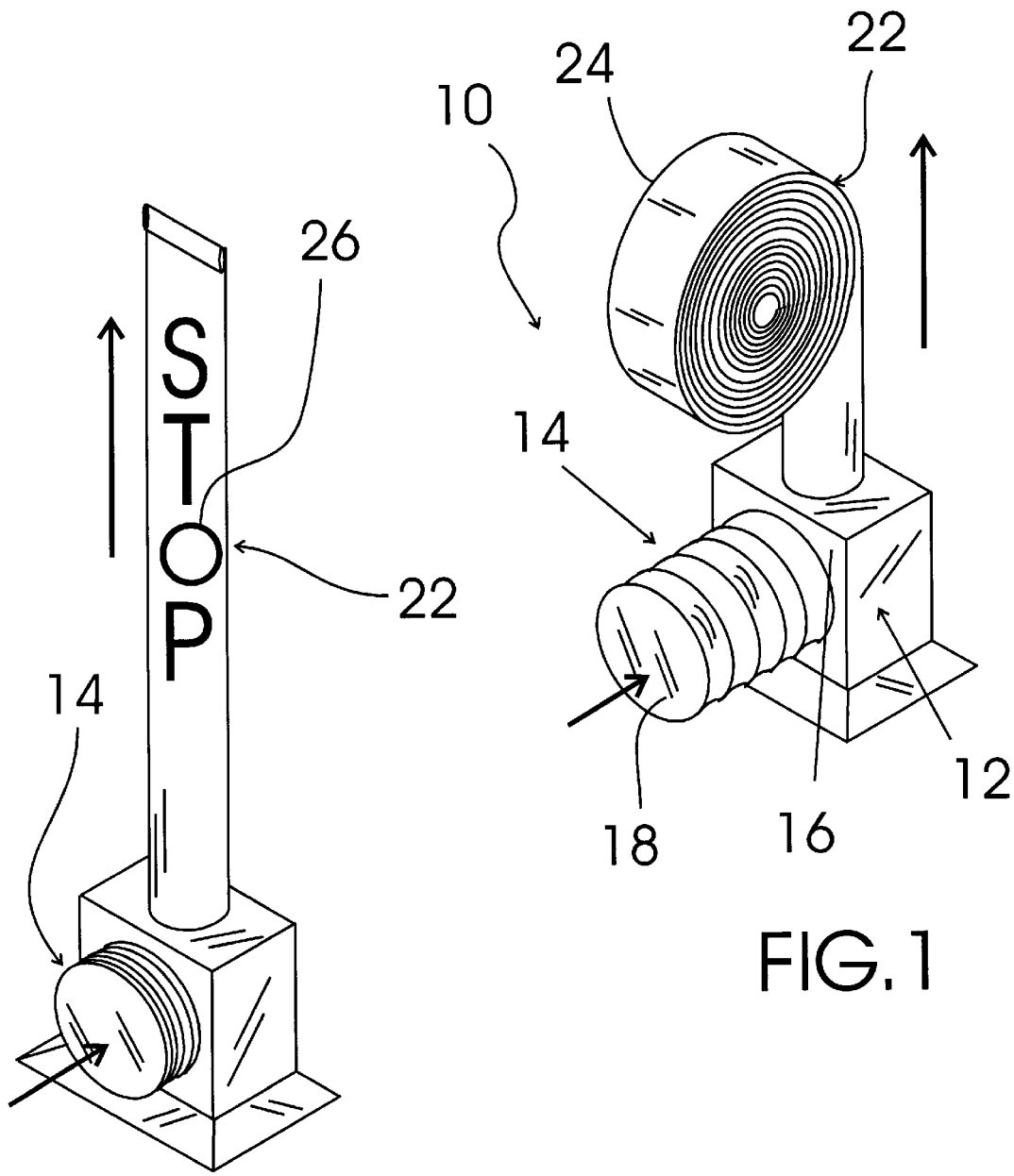

12
VEHICLE POSITION INDICATOR

TECHNICAL FIELD

The present invention relates to parking aids and more particularly to a vehicle position indicator that is used in tight parking situations to confirm the position of a vehicle being parked that includes a weighted base assembly, a deployment bellows assembly in connection with the weighted base assembly, and an inflatable recoil tube in air flow communication with the deployment bellows assembly and supported on the weighted base; the deployment bellows assembly having an air volume equal to the air volume of the inflatable recoil tube such that when the deployment bellows is fully compressed, the inflatable recoil tube is fully inflated.

BACKGROUND ART

It is often difficult when parking a vehicle within a garage or other confined space to consistently determine the desired parking position of the vehicle. It would be a benefit, therefore to have a device that includes an alerting mechanism that would deploy when a portion of the vehicle contacts a deployment mechanism positioned in a predetermined location to alert the driver that the desired position had been achieved. Because battery powered devices can fail to operate when the batteries become discharged, it would be a further benefit to have such a device that operated without electrical power.

GENERAL SUMMARY DISCUSSION OF INVENTION

It is thus an object of the invention to provide a vehicle position indicator that includes an alerting mechanism that deploys when a portion of the vehicle contacts a deployment mechanism positioned in a predetermined location to alert the driver that the desired position has been achieved It is a further object of the invention to provide a vehicle position indicator that includes a weighted base assembly, a deployment bellows assembly in connection with the weighted base assembly, and an inflatable recoil tube in air flow communication with the deployment bellows assembly and supported on the weighted base; the deployment bellows assembly having an air volume equal to the air volume of the inflatable recoil tube such that when the deployment bellows is fully compressed, the inflatable recoil tube is fully inflated.

It is a still further object of the invention to provide a vehicle position indicator that accomplishes all or some of the above objects in combination.

Accordingly, a vehicle position indicator is provided. The vehicle position indicator includes a weighted base assembly, a deployment bellows assembly in connection with the weighted base assembly, and an inflatable recoil tube in air flow communication with the deployment bellows assembly and supported on the weighted base; the deployment bellows assembly having an air volume equal to the air volume of the inflatable recoil tube such that when the deployment bellows is fully compressed, the inflatable recoil tube is fully inflated. In a preferred embodiment the inflatable recoil assembly is positioned with respect to a sculptural structure to provide an amusing effect when the inflatable recoil assembly is fully deployed. The base is preferably adapted for postioning on the floor as well as mounting to a wall or other vertical support. In addition, it is also preferable to provide a deployment bellows assembly adapted to be contacted and rolled onto by the vehicle tire.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the vehicle position indicator of the present invention showing the weighted base assembly, the vehicle bumper height positioned deployment bellows assembly supported on a front surface of the weighted base; and an inflatable recoil tube in air flow communication with the deployment bellows assembly; the deployment bellows assembly having an air volume equal to the air volume of the inflatable recoil tube such that when the deployment bellows is fully compressed, the inflatable recoil tube is fully inflated.

FIG. 2 is a perspective view of an exemplary embodiment of the vehicle position indicator of the present invention showing the bumper height positioned deployment bellows fully compressed and the inflatable recoil tube fully inflated to reveal the message "STOP".

EXEMPLARY MODE FOR CARRYING OUT THE INVENTION

Figure 3:
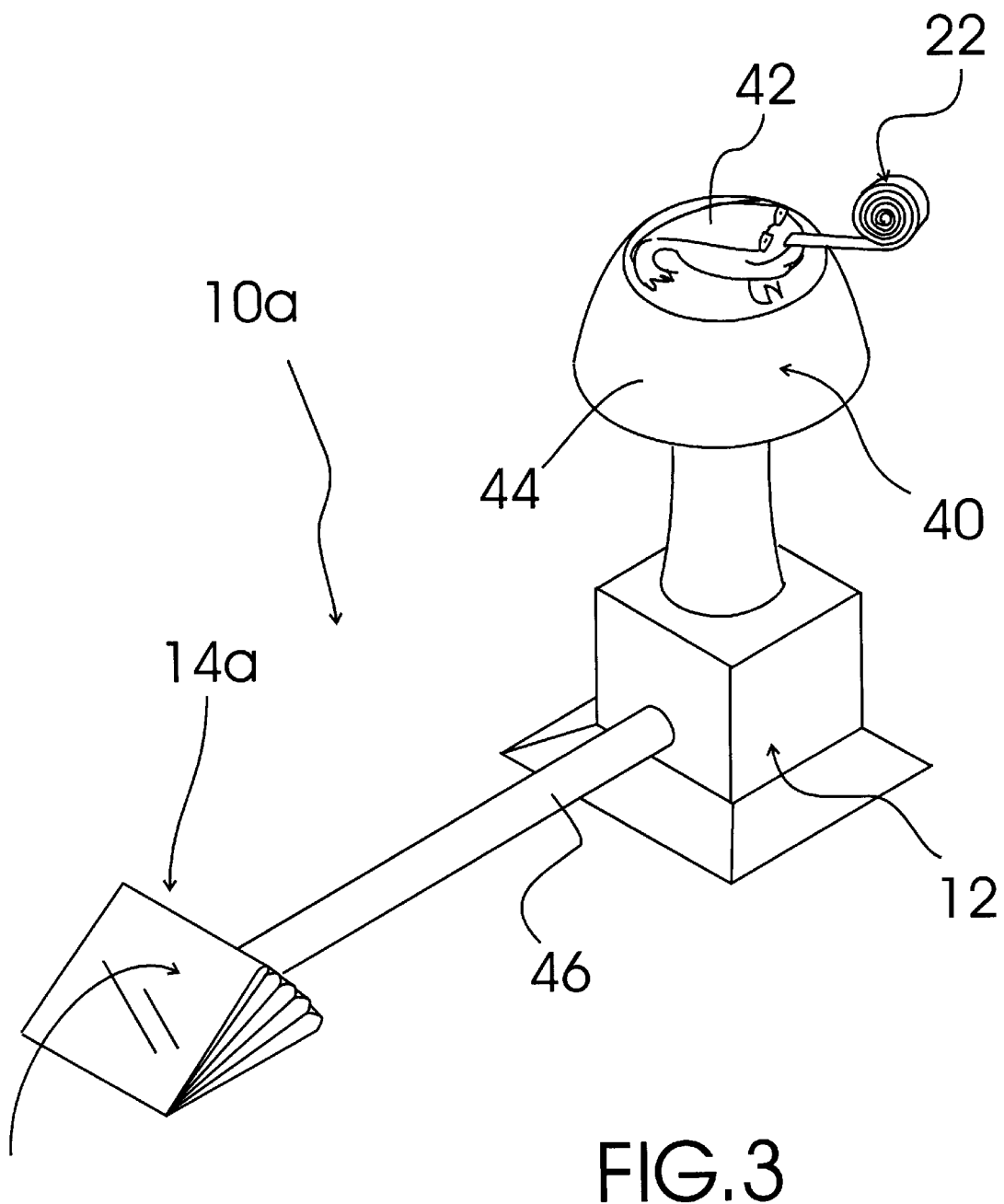
FIG. 3 is a perspective view of a second exemplary vehicle position indicator including a ground positioned deployment bellows adapted for being compressed by a vehicle tire; a weighted base having an inflatable recoil tube support structure having the general shape of a frog perched atop a mushroom provided thereon wherein the inflatable recoil tube is positioned and oriented with respect to the mouth of the frog so as to simulate the tongue of the frog; and a connecting tube providing an airflow passageway between the deployment bellows and the inflatable recoil tube.

FIG. 1 shows an exemplary embodiment of the vehicle position indicator of the present invention, generally designated 10. Vehicle position indicator 10 includes a weighted, molded plastic base assembly, generally designated 12; a flexible plastic deployment bellows assembly, generally designated 14 supported on a front surface 16 of weighted base 12 and having a contact surface 18 positioned at a height to allow contact with the bumper of the vehicle to be positioned; and an inflatable recoil tube, generally designated 22 in air flow communication with deployment bellows assembly 14. Referring to FIG. 2, deployment bellows assembly 14 has an air volume equal to the air volume of inflatable recoil tube 22 such that when deployment bellows 14 is fully compressed, inflatable recoil tube 22 is fully inflated such that coiled portion 24 (FIG. 1) is extended fully out to reveal a warning message 26 and vice versa.

FIG. 3 shows a second exemplary vehicle position indicator, generally designated 10a that includes a ground positioned deployment bellows, generally designated 14a adapted into a wedge shape for being compressed by a vehicle tire; and an inflatable recoil tube support structure, generally designated 40, having the general shape of a frog 42 perched atop a mushroom 44 provided on weighted base 12 and wherein inflatable recoil tube 22 is positioned and oriented with respect to the mouth of frog 42 so as to simulate the tongue of the frog. A connecting tube 46 is provided to allow airflow between deployment bellows 14a and inflatable recoil tube 22.

It can be seen from the preceding description that a vehicle position indicator and a vehicle positioning method have been provided that includes a vehicle position indicator that includes an alerting mechanism that deploys when a portion of the vehicle contacts a deployment mechanism positioned in a predetermined location to alert the driver that the desired position has been achieved; and that includes a weighted base assembly, a deployment bellows assembly in connection with the weighted base assembly, and an inflatable recoil tube in air flow communication with the deployment bellows assembly and supported on the weighted base; the deployment bellows assembly having an air volume equal to the air volume of the inflatable recoil tube such that when the deployment bellows is fully compressed, the inflatable recoil tube is fully inflated.

It is noted that the embodiment of the vehicle position indicator described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method of positioning a vehicle comprising the steps of:

a) providing a vehicle position indicator comprising:
      a weighted base assembly;
      a deployment bellows assembly in connection with said weighted base assembly; and
      an inflatable recoil tube in air flow communication with said deployment bellows assembly and supported on said weighted base assembly;
         said deployment bellows assembly having deployment bellows having an air volume equal to the air volume of said inflatable recoil tube such that when said deployment bellows is fully compressed, said inflatable recoil tube is fully inflated;

b) positioning the deployment bellows in a desired location; and c) contacting and compressing said deployment bellows with a portion of the vehicle.

* * * * *